(12) United States Patent
Huang et al.

(10) Patent No.: US 12,417,396 B2
(45) Date of Patent: Sep. 16, 2025

(54) BENCHMARKING PROTOCOL FOR QUANTUM GATES

(71) Applicant: Alibaba Innovation Private Limited, Singapore (SG)

(72) Inventors: Jiachen Huang, San Mateo, CA (US); Jianxin Chen, Kirkland, WA (US)

(73) Assignee: Alibaba Innovation Private Limited, Singapore (SG)

( * ) Notice: Subject to any disclaimer, the term of this patent is extended or adjusted under 35 U.S.C. 154(b) by 800 days.

(21) Appl. No.: 17/662,774

(22) Filed: May 10, 2022

(65) Prior Publication Data
US 2022/0374751 A1  Nov. 24, 2022

Related U.S. Application Data

(60) Provisional application No. 63/187,579, filed on May 12, 2021.

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
CPC ............................... G06N 10/20; G06N 10/80

USPC ................... 326/2, 5, 6; 712/2, 200; 257/31; 505/170
See application file for complete search history.

(56) References Cited

U.S. PATENT DOCUMENTS

| | | | |
|---|---|---|---|
| 12,067,457 B2 * | 8/2024 | Smelyanskiy | G06N 10/60 |
| 2014/0354326 A1 * | 12/2014 | Bonderson | G06N 10/40 |
| | | | 505/170 |

\* cited by examiner

*Primary Examiner* — Arnold M Kinkead
(74) *Attorney, Agent, or Firm* — Finnegan, Henderson, Farabow, Garrett & Dunner, LLP (57) ABSTRACT

Systems and methods for performing iFRB benchmarking are disclosed. Exemplary systems can include a quantum component and a classical component. The classical component can include at least one processor and at least one non-transitory computer-readable medium. The non-transitory computer-readable medium can contain instructions that, when executed by the at least one processor, cause the classical component to perform operations. The operations can include generating a gate sequence including test gates interleaved with gate subsequences equivalent to Haar random two-qubit gates. Each gate subsequence can include at least one SQiSW gate. The operations can further include generating a recovery gate based on the gate sequence. The operations can further include providing commands applying the gate sequence and the recovery gate to the quantum component and obtaining an output from the quantum component.

20 Claims, 10 Drawing Sheets

```
Decomposing an arbitrary two-qubit gate into a sequence of single qubit relations and the SQiSW gate.
1: procedure DECOMP(U)                                                              ▷ Decompose U into single qubit gates and the SQiSW gate
2:   g, (x, y, z), A₁, A₂, B₁, B₂ ← KAKDECOMP(U)
3:   if |x| ≤ x − y then
4:     C₁, C₂ ← f(x, y, z)
5:     V ← SQiSW(C₁ ⊗ C₂)SQiSW
6:     g', (x, y, z), D₁, D₂, E₁, E₂ ← KAKDECOMP(V)      ▷ L(x, y, z) = (1/g')(D₁† ⊗ D₂†)SQiSW(C₁ ⊗ C₂)SQiSW(E₁† ⊗ E₂†)          ▷ 2 SQiSW gates needed
7:     return E₁†B₁ ⊗ E₂†B₂||SQiSW||C₁ ⊗ C₂|SQiSW||A₁D₁† ⊗ A₂D₂†                                                    ▷ Global phases g, g' omitted
8:   else
9:     (x', y', z'), F₁, F₂, G₁, G₂, H₁, H₂ ← CANONICALIZE(x, y, z)                                                  ▷ 3 SQiSW gates needed
10:    C₁, C₂ ← (x', y', z')
11:    V ← SQiSW(C₁ ⊗ C₂)SQiSW
12:    g', (x', y', z'), D₁, D₂, E₁, E₂ ← KAKDECOMP(V)    ▷ L(x', y', z') = (1/g')(D₁† ⊗ D₂†)SQiSW(C₁ ⊗ C₂)SQiSW(E₁† ⊗ E₂†)
13:    (x', y', z') = (F₁ ⊗ F₂)L(x', y', z')(G₁ ⊗ G₂)SQiSW(H₁ ⊗ H₂), x', y', z' ∈ W
14:    return H₁B₁ ⊗ H₂B₂||SQiSW||E₁†G₁ ⊗ E₂†G₂|SQiSW||C₁ ⊗ C₂|SQiSW||A₁F₁D₁† ⊗ A₂F₂D₂†
15: end if
16: end procedure
17: procedure CANONICALIZE(x, y, z)  ▷ Decompose an arbitrary gate into one SQiSW and one L(x', y', z') where |z'| ≤ x' − y' and output
     the coefficients (x', y', z') and the interleaving single qubit rotations
18:   A₀ ← I, A₁ ← I, B₁ ← I, B₂ ← R_y(π/2), C₁ ← R_x(π/4), C₂ ← R_x(−π/4)
19:   if x > π/8 then
20:     y' ← y − π/8, x' ← x' − π/8, s ← sgn(z), x' ← −x, y ← −y, z' ← |z|
21:   else
22:     x' ← x + π/8, z' ← z + π/8
23:   end if
24:   if |x'| ≤ |z'| then
25:     x', z ← −z', −y', A₁ ← R_x(π/2)B₁, B₂ ← R_x(−π/2)B₂, C₁ ← R_x(π/4), C₂ ← C₂R_x(π/4)
26:   end if
27:   if z ≤ 0 then
28:     z ← −z', y' ← −y', A₁ ← ZA₁Z, A₂ ← ZA₂Z, B₁ ← ZB₁Z
29:   end if
30:   return (x', y', z'), A₁, A₂, B₁, B₂, C₁, C₂
31: end procedure
```

Generating iFRB sequences

```
 1: procedure GENRANDSEQ(m,i)                  ▷ Generate a random FRB sequence of length m, interleaved with SQiSW iff i is True
 2:     U ← I
 3:     S ← ε
 4:     for j = 1, ..., m − 1 do
 5:         U_j, S_j ← GENRANDGATE()
 6:         if i == True then
 7:             U ← SQiSW · U_j · U
 8:             S ← S ∥ S_j ∥ SQiSW
 9:         else
10:             U ← U_j · U
11:             S ← S ∥ S_j
12:         end if
13:     end for
14:     return S ∥ DECOMP(U^†)                 ▷ Append the recovery gate
15: end procedure
16: procedure GENRANDGATE()                    ▷ Generate a Haar random SU(4) gate and its corresponding decomposition into SQiSW sequence
17:     U ← GENHAARSU(4)                       ▷ Generate a Haar random element in SU(4)
18:     return U, DECOMP(U)
19: end procedure
```

FIG. 5

Accelerated generation of Haar random gates in SQiSW sequences

1: procedure GENRANDGATEACC  ▷ Generate a Haar random $SU(4)$ gate and its decomposition into SQiSW and single qubit gates
2:   $B_1, B_2, C_1, C_2 \leftarrow$ GENHAARSU2()  ▷ Generate four Haar random elements in $SU(2)$
3:   $x, y, z \leftarrow$ RESAMPWEYL()
4:   if $|z| \leq x - y$ then
5:     $A_1, A_2 \leftarrow$ INTERLEAVINGSINGLEQUBITROTATIONS$(x, y, z)$
6:     return $B_1 \otimes B_2 |\text{SQiSW}| A_1 \otimes A_2 |\text{SQiSW}| C_1 \otimes C_2$
7:   else
8:     $D_1, D_2, E_1, E_2, F_1, F_2, x', y', z' \leftarrow$ CANONICALIZE$(x, y, z)$
9:     $a, b, c, d, g_1, g_2 \leftarrow$ KAKDECOMPH$LL(x', y', z')$
10:    $A_1, A_2 \leftarrow$ INTERLEAVINGSINGLEQUBITROTATIONS$(x', y', z')$
11:    return $B_1 \otimes B_2 |\text{SQiSW}| E_1 \otimes E_2 |\text{SQiSW}| A_1 \otimes A_2 |\text{SQiSW}| C_1 \otimes C_2$
12:  end if
13: end procedure
14: procedure GENHAARSU2
15:  $(a, b, c, d) \leftarrow \mathcal{N}(0, 1)$
16:  return $\begin{bmatrix} a+ib & c+id \\ -c+id & a-ib \end{bmatrix} / \sqrt{a^2+b^2+c^2+d^2}$
17: end procedure
18: procedure RESAMPWEYL  ▷ Rejection sampling of a point in Weyl chamber according to $d_{HS}$
19:  while True do
20:    $x \leftarrow U([0,1]) \ast \pi \leftarrow x^{1/2} \ast \frac{\pi}{2}$
21:    $y \leftarrow U([0,1]) \ast y \leftarrow y^{1/2} \ast x$
22:    $z \leftarrow U([-1,1]) \ast z \leftarrow z^{2} \ast y$
23:    $k \leftarrow 6(1.4 \sin(2(x+y))\sin(2(y+z))\sin(2(z+x))\sin(2(x-y))\sin(2(y-z))\sin(2(x+z)))$
24:    if $k$ then
25:      return $x, y, z$
26:    end if
27:  end while
28: end procedure

BENCHMARKING PROTOCOL FOR QUANTUM GATES

CROSS-REFERENCE TO RELATED APPLICATIONS

This application is a continuation of U.S. Non-Provisional Patent Application No. 63/187,579, filed on May 12, 2021, which is hereby incorporated by reference in its entirety.

TECHNICAL FIELD

The present disclosure generally relates to quantum computing, and more particularly, to a benchmarking protocol that uses the square root of iSWAP gate (SQiSW gate).

BACKGROUND

Quantum computing can address classically intractable computational problems. However, existing quantum computational devices are limited by various sources of error and imprecision. In particular, two-qubit gate operations constitute a major source of complex errors in existing quantum computational devices. Realization of an ultra-high fidelity two-qubit gate may improve the performance of quantum computing algorithms and advance the goal of fault-tolerant quantum computation for complex quantum-computational tasks.

SUMMARY

The disclosed systems and methods relate to Interleaved Fully Randomized Benchmarking (iFRB) using the SQiSW gate and include a system for performing iFRB.

The disclosed embodiments include a system for performing iFRB. The system can include a quantum component and a classical component. The classical component can include at least one processor and at least one non-transitory computer-readable medium. The at least one non-transitory computer-readable medium can contain instructions that, when executed by the at least one processor, cause the classical component to perform operations. The operations can include generating a gate sequence including test gates interleaved with gate subsequences equivalent to Haar random two-qubit gates. Each gate subsequence can include at least one SQiSW gate. The operations can further include generating a recovery gate based on the gate sequence. The operations can further include providing commands applying the gate sequence and the recovery gate to the quantum component and obtaining an output from the quantum component.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIGS. 3A and 3B depict an exemplary method for decomposing an arbitrary two-qubit gate into a sequence of single-qubit gates and SQiSW gate(s) and exemplary pseudocode implementing the method, in accordance with disclosed embodiments.

FIG. 6 depicts an exemplary method for performing a quantum computational task using SQiSW gates and single-qubit gates, in accordance with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Quantum algorithms can be expressed in terms of sequences of one or more quantum gates. An arbitrary quantum gate can be implemented using a sequence of other quantum gates. The particular quantum gates used to implement the arbitrary quantum gate can depend on the physical implementation of the quantum device (e.g., a particular physical implementation can be associated with one or more "native" quantum gates). The performance of the arbitrary quantum gate can depend on the performance of the native quantum gates used to implement the arbitrary quantum gate.

As described above, two-qubit gate operations constitute a major source of complex errors in existing quantum computational devices. The disclosed embodiments concern benchmarking a particular high-fidelity two-qubit quantum gate, the SQiSW gate, which has the unitary:

$$SQiSW \equiv \begin{bmatrix} 1 & 0 & 0 & 0 \\ 0 & \frac{1}{\sqrt{2}} & \frac{i}{\sqrt{2}} & 0 \\ 0 & \frac{i}{\sqrt{2}} & \frac{1}{\sqrt{2}} & 0 \\ 0 & 0 & 0 & 1 \end{bmatrix}$$

General quantum circuits can be implemented using SQiSW gates and single-qubit gates. Consistent with disclosed embodiments, arbitrary two-qubit gates (and certain families of two-qubit gates) can be decomposed into sequences of SQiSW gates. In some instances, two SQiSW gates can be interleaved by one or more single-qubit gates. The decomposition can be done efficiently on a classical computational device, and the compiled sequence can be readily executed on an arbitrary quantum computational device supporting a native implementation of the SQiSW gate and arbitrary single-qubit gates.

For some computational tasks, an implementation using SQiSW gates and single qubit rotations can decrease the total number of quantum gates involved in the computational task, as compared to implementations that decompose arbitrary two-qubit gates into gate sequences including other, conventional two-qubit gates (e.g., CNOT, iSWAP, or the like). Thus, implementation using SQiSW gates and single qubit rotations can have shorter gate sequences than conventional implementations, making the computational process more error-resilient. Independent of any decrease in the total gate count, the fast execution and high fidelity of the SQiSW gate can save time and result in higher overall fidelities for the implemented computational tasks, as compared to implementations using other two-qubit gates.

Conventional benchmarking methods are not suitable for SQiSW gates. Such methods may be applicable to a restricted family of gates that does not include SQiSW gates, may evaluate a set of gates as a whole rather than the SQiSW gate in particular, or may suffer from influences by quantum computational components other than the SQiSW gate implementation (e.g., state preparation and measurement error). The interleaved Fully Randomized Benchmarking (iFRB) framework can theoretically be configured for use with the SQiSW gate but requires the non-trivial generation of arbitrary two-qubit gates.

The disclosed embodiments provide systems and method for benchmarking SQiSW gates using implementations of the iFRB framework adapted for benchmarking the SQiSW gate. Two general methods are provided, both involving decomposition of arbitrary two-qubit gates into gate sequences including SQiSW gates. In a first method, the two-qubit gates can be decomposed into several SQiSW gates interleaved by single-qubit rotations. This first method may require multiple, computationally expensive Cartan decompositions (Cartan decomposition being a generalization of singular value decomposition). In a second method, performance of a Cartan decomposition for a Haar random gate used in the benchmarking is conditioned on the interaction coefficients for the Haar random gate. In this manner, the second method reduces the computational requirements for performing benchmarking.

The disclosed benchmarking techniques can enable comparisons between different physical implementations of SQiSW gates. The results of such comparisons can then inform the continued design, optimization, and calibration of SQiSW gate implementations. Thus, the disclosed embodiments can support the continued development of SQiSW gate implementations. As described herein, rapid and high fidelity SQiSW gates can in turn, enable accelerated quantum computation, larger-scale quantum computation, and broader use cases for quantum computing. Thus, the disclosed embodiments constitute a technical improvement in quantum computing.

A general two-qubit gate can be mathematically formulated as an element of the special unitary group SU(4). Equivalence classes can be defined on SU(4) using Cartan decomposition and the concept of the Weyl chamber. A two-qubit gate can be equivalent to another two-qubit gate when the two gates differ by single-qubit correction gates. Thus, an arbitrary two-qubit gate can be constructed from another two-qubit gate or collection of two-qubit gates and appropriate single qubit correction gates.

Figure 1:
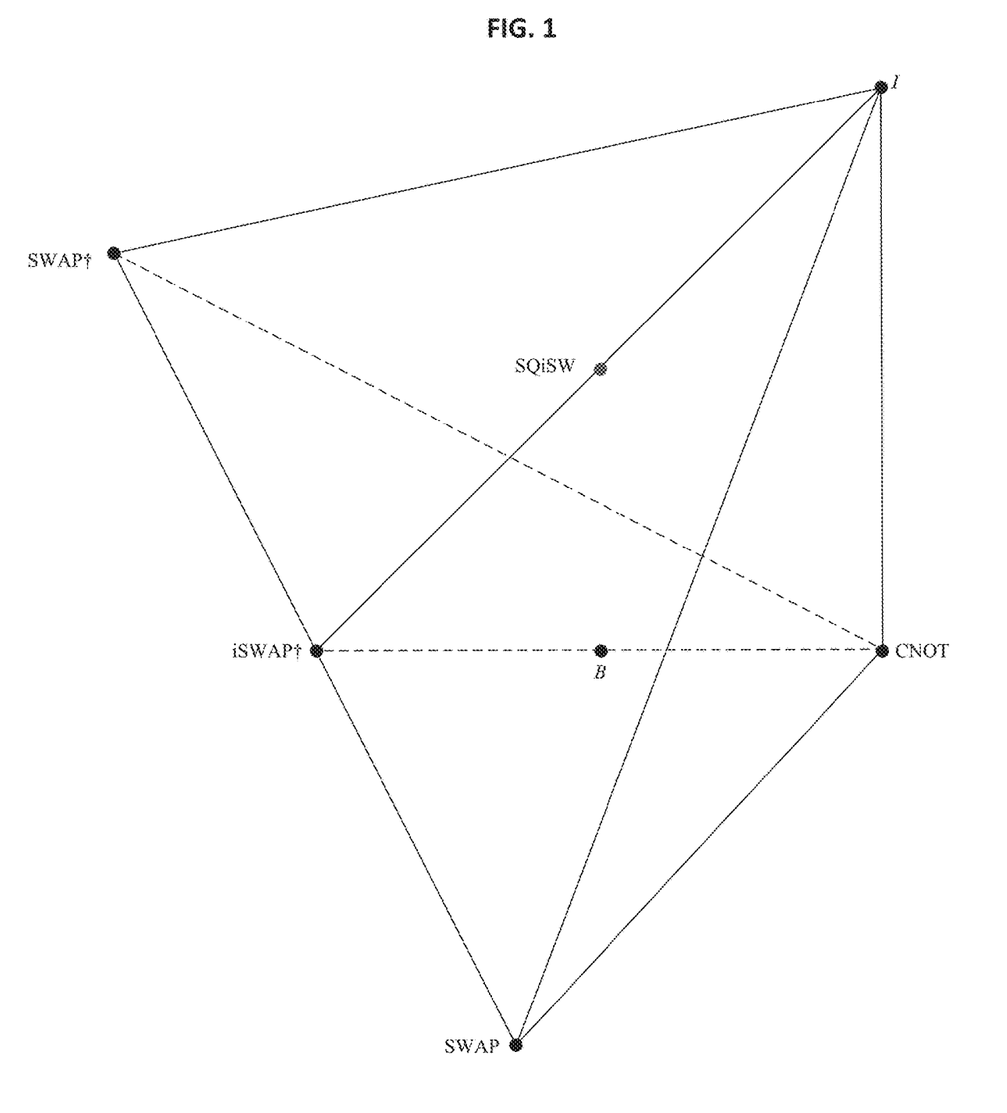
FIG. 1 depicts the Weyl chamber and the positions of common gates.

FIG. 1 depicts the Weyl chamber and the positions of common gates. Note that SQiSW lies in the midpoint of the identity and iSWAP. The point SWAP† is to be identified with the point SWAP but is drawn separately for easier visualization.

Theorem 1 (Cartan decomposition). For an arbitrary $U \in SU(4)$, there exists a unique $$\vec{\eta} = (x, y, z), \frac{\pi}{4} \geq x \geq y \geq |z|,$$

single qubit rotations $A_0$, $A_1$, $B_0$, $B_1 \in SU(2)$ and a global phase $g \in \{1, i\}$ such that $U = g \cdot (A_1 \otimes A_2) \exp\{i\vec{\eta} \cdot \vec{\Sigma}\}(B_1 \otimes B_2)$, where $\vec{\Sigma} \equiv [\sigma_X \otimes \sigma_X, \sigma_Y \otimes \sigma_Y, \sigma_Z \otimes \sigma_Z]$. The tuple $(g, \vec{\eta}, A_0, A_1, B_0, B_1)$ is called the Cartan (or KAK) decomposition of the unitary U.

The equivalence class of a unitary U under local unitaries, denoted as $\overline{U}$, is characterized by the interaction coefficients $\vec{\eta}(U)$, which lives in a 3-dimensional tetrahedron called the Weyl chamber:

$$W \equiv \left\{ \frac{\pi}{4} \geq x \geq y \geq |z| \, \bigg| \, (x, y, z) \in \mathbb{R}^3 \right\}.$$

Two unitaries U, $V \in SU(4)$ are locally equivalent, or $U \sim V$, if $\eta(U) = \eta(V)$. Let $L(x, y, z) \equiv \exp(i[x, y, z] \cdot \vec{\Sigma})$ be the canonical element of the equivalence class. Then $U \sim L(\eta(U))$ for all $U \in SU(4)$.

The single qubit rotations can be defined based on the following equations:

$$R_x(\theta) = \begin{bmatrix} \cos(\theta) & i\sin(\theta) \\ i\sin(\theta) & \cos(\theta) \end{bmatrix},$$

$$R_y(\theta) = \begin{bmatrix} \cos(\theta) & \sin(\theta) \\ -\sin(\theta) & \cos(\theta) \end{bmatrix},$$

$$R_z(\theta) = \begin{bmatrix} \cos(\theta) + i\sin(\theta) & 0 \\ 0 & \cos(\theta) - i\sin(\theta) \end{bmatrix}..$$

Figure 2A:
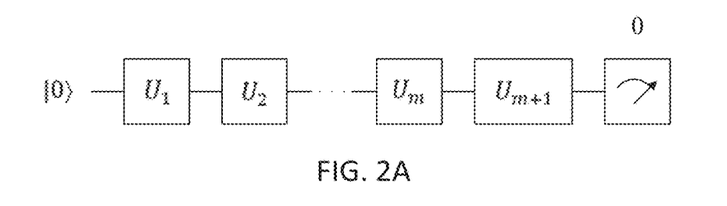
FIG. 2A depicts Fully Randomized Benchmarking (FRB).

FIG. 2A depicts Fully Randomized Benchmarking (FRB). FRB can be used to determine the amplitude of the gate-independent, time-independent, average noise level in a quantum system, while isolating out the errors caused by imperfect state preparation and measurement (SPAM error). As depicted in FIG. 2A, FRB can start with the qubit in a particular state (e.g., the |0⟩ state). For a d-dimensional quantum system, choose an appropriate gate sequence length m, choose m gates $U_1, \ldots U_m$ i.i.d. according to a probability distribution over the group of gates and compute $U_{m+1}$ (e.g., the recovery gate) such that $U_{m+1}, \ldots U_m = 1$ assuming there are no errors. The gate sequence $U_1 \| U_2 \| U_m \| U_{m+1}$ is then performed on the initial state and subsequently measured in the computational basis. A survival probability $p_{m,j}$ of measuring the initial state (e.g., the |0⟩ state) is estimated from repeated experiments with sequence j of length m+1. By averaging over many different sequences with the same length and collecting data over several different gate sequence lengths, one can extract the average gate fidelity r=1−(1−u)(d−1)/d, where d is the dimension of the quantum system, and u is obtained by fitting the experimental observation of the survival probability into an exponentially decaying curve parameterized by A, B, u:

$$\mathbb{E}_j[p_{m,j}]=A \cdot u^m + B.$$

Figure 2B:
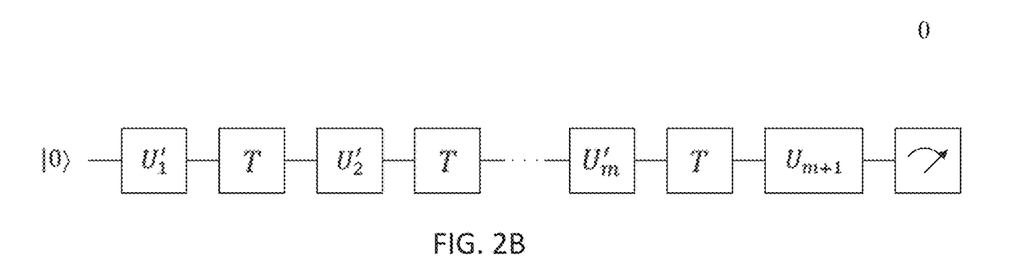
FIG. 2B depicts aspects of iFRB.

FIG. 2B depicts aspects of Interleaved Fully Randomized Benchmarking (iFRB). iFRB can used to benchmark the average fidelity of a specific gate (e.g., a "target gate"). The design of iFRB is selected to exclude not only the SPAM error, but the errors of other gates in a gate set. In some implementations, an iFRB experiment can include two parts. The first part of iFRB can be an ordinary FRB protocol on a gate set (e.g., a "reference gate set").

The second part of iFRB can be randomized benchmarking with interleaved sequences. Given a target gate T, a random gate sequence of length m, $U_1$, $U_2$, $U_m$, can be selected according to a probability distribution over the group of gates. The final recovery gate can be chosen to be $U'_{m+1}=(T \cdot U_m \cdot T \ldots T \cdot U_2 \cdot T \cdot U_1)\dagger$. The gate sequence $U_1 \| T \| U_2 \| T \| \ldots \| T \| U_m \| T \| U_{m+1}'$ can then performed as in the FRB experiment. A different error quantity v can be calculated from the decay rate of the average survival probability with respect to the sequence length, similar to u in the ordinary RB experiment. The average fidelity of the target gate can then be calculated as:

$$r_T = \frac{(1-v/u)(d-1)}{d}.$$

Practicable implementation of iFRB can require the efficient generation and implementation of Haar random arbitrary rotations. Accordingly, conventional interleaved randomized benchmarking approaches do not rely upon Haar randomization, instead using a smaller gate set called the Clifford gate set for the reference gate set. Such approaches benefit from using a discrete set of operations, rather than arbitrary rotation. But they can only be used to benchmark Clifford gates. Unfortunately, Clifford gates do not by themselves provide the full capacity of quantum computing, and some non-Clifford gates must be added to implement universal quantum computing. Benchmarking such gates poses a problem for such conventional benchmarking approaches. The SQiSW gate is a non-Clifford gate and thus cannot be benchmarked under using conventional Clifford-based iRB. In contrast, the disclosed systems and method enable benchmarking of all gates including the SQiSW gate.

Figure 3A:
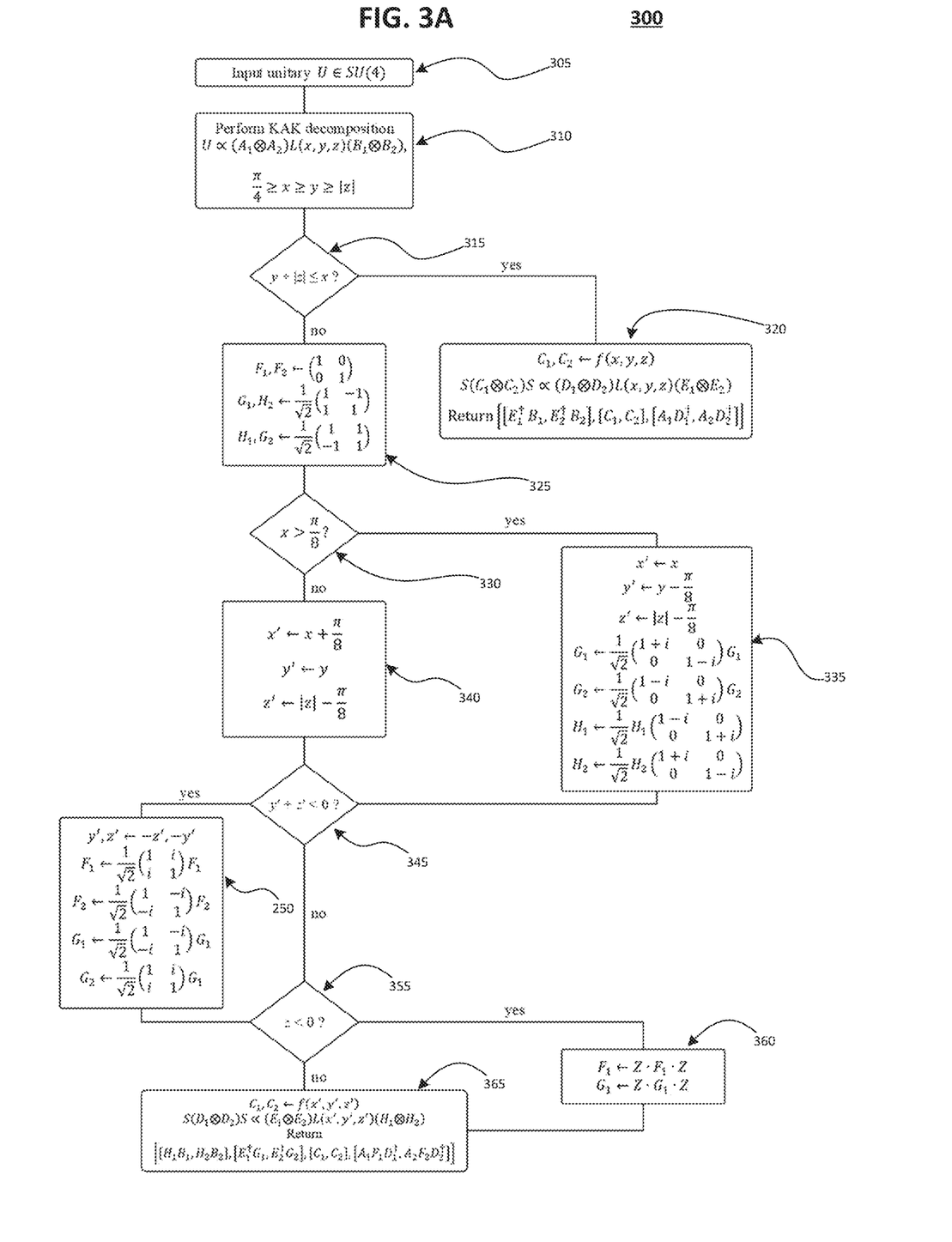

FIG. 3A depicts an exemplary method 300 for decomposing an arbitrary two-qubit gate into a sequence of single-qubit gates and SQiSW gate(s), in accordance with disclosed embodiments. FIG. 3B depicts a pseudocode implementation of method 300.

Method 300 can include obtaining a two-qubit gate in step 305. The two-qubit gate can be an arbitrary two-qubit gate. Method 300 can include performance of a Cartan decomposition of the arbitrary two-qubit gate in step 310. If the interaction parameters of the arbitrary two-qubit gate satisfy a Weyl condition in step 315, then the two-qubit gate can be implemented using two SQiSW gates according to the formulation given in step 320.

Otherwise, the two-qubit gate can be implemented using three SQiSW gates. The interaction parameters can be canonicalized, decomposing the arbitrary gate into an SQiSW gate, a canonical element corresponding to interaction parameters that satisfy the Weyl condition, and local gates. In step 325, the local gates can be initialized. In step 330, based on the value of the original x interaction parameter the values of the interaction parameters and the local gates can be updated (in step 335) or the values of the interaction parameters can be updated (in step 340). In step 345, based on the updated values of the y and z interaction parameters, the interaction parameters and the local gates can be updated (in step 350). In step 355, based on the sign of the original z parameters, the z interaction parameter and certain local gates can be updated in step 360. The two-qubit gate can then be implemented using three SQiSW gates according to the formulation given in step 365.

In the depicted decompositions of FIGS. 3A and 3B:

$$f(x, y, z) = \begin{pmatrix} e^{i\gamma}\cos\alpha & i\sin\alpha \\ i\sin\alpha & e^{-i\gamma}\cos\alpha \end{pmatrix},$$

$$g(x, y, z) = \begin{pmatrix} \cos\beta & i\sin\beta \\ i\sin\beta & \cos\beta \end{pmatrix},$$

$$\alpha = \frac{1}{2}\arccos(\cos 2x - \cos 2y + \cos 2z + 2\sqrt{C}),$$

$$\beta = \frac{1}{2}\arccos(\cos 2x - \cos 2y + \cos 2z + 2\sqrt{C}),$$

$$\gamma = \arccos\left(\text{sgn}z \cdot \sqrt{\frac{4\cos^2 x \cos^2 z \sin^2 y}{4\cos^2 x \cos^2 z \sin^2 y + \cos 2x \cos 2y \cos 2z}}\right),$$

$$C = \sin(x+y-z)\sin(x-y+z)\sin(-x-y-z)\sin(-x+y+z).$$

Figure 4:
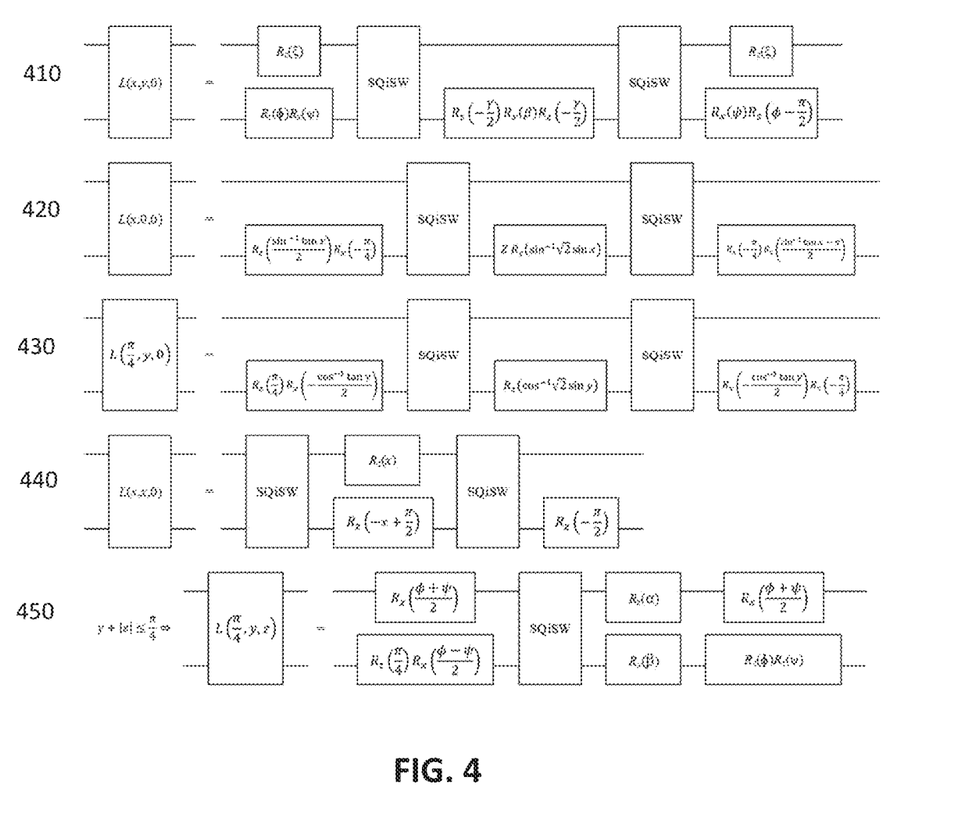
FIG. 4 depicts exemplary generic decompositions of special and improper orthogonal gates, in accordance with disclosed embodiments.

Applying method 300, certain families of quantum gates can be represented in terms of generic sequences of single-qubit gates and SQiSW gate(s). FIG. 4 depicts generic decompositions of special and improper orthogonal gates, in accordance with disclosed embodiments.

Consistent with disclosed embodiments, special orthogonal gates can involve arbitrary X and Y rotations, but not Z rotations. Decomposition 410 depicts an exemplary decomposition of such a special orthogonal gate into single-qubit gates and SQiSW gates. Gates locally equivalent to special orthogonal gates in SO(4) (e.g., gates that lie in the I-CNOT-iSWAP plane) can be generated using two or more SQiSW gates. Moreover, for such gates, the expressions of α, β, γ can be simplified as:

$$\alpha = 0,$$

$$\beta = \arccos\sqrt{\cos 2x + 2\sin^2 y},$$

$$\gamma = \arccos\sqrt{\frac{4\cos^2 x \sin^2 y}{\cos 2x + 2\sin^2 y}}.$$

Therefore, one can check by applying the gauge freedom that $$L(x, y, z) \sim SQiSW \cdot (I \otimes B) \cdot SQiSW,$$

where $$B = R_z\left(-\frac{\gamma}{2}\right)R_x(\beta)R_z\left(-\frac{\gamma}{2}\right) =$$

$$\begin{bmatrix} 2\cos x\sin y - i\sqrt{\cos 2x\cos 2y} & i\sqrt{\cos 2y - \cos 2x} \\ i\sqrt{\cos 2y - \cos 2x} & 2\cos x\sin y + i\sqrt{\cos 2x\cos 2y} \end{bmatrix}.$$

In the case of special orthogonal gates, the single qubit corrections can be solved analytically. Let $$\xi \equiv -\frac{1}{2}\arcsin\left(\sin y \cdot \sqrt{\frac{2\cos 2x}{\cos 2x + \cos 2y}}\right),$$

$$\beta \equiv \frac{1}{2}\arccos\left(-\cos y \cdot \sqrt{\frac{2\cos 2x}{\cos 2x + \cos 2y}}\right),$$

$$\psi \equiv \frac{1}{2}\arccos(\cot(x)\tan(y)).$$

Then $$L(x, y, 0) = R_z(\xi) \otimes R_z(\phi)R_x(\psi)) \cdot$$
$$SQiSW \cdot (I \otimes B) \cdot SQiSW \cdot \left(R_z(\xi) \otimes R_x(\psi)R_z\left(\phi - \frac{\pi}{2}\right)\right).$$

Specific examples of special orthogonal gates include CPHASE family, the super-controlled gate family, and the iSWAP family.

Decomposition 420 depicts an exemplary decomposition of a gate in the CPHASE family (x, 0, 0), where $B=ZR_y$ (arcsin($\sqrt{2}$ sin x)).

Decomposition 430 depicts an exemplary decomposition of a gate in the super-controlled gate family $$\left(\frac{\pi}{4}, y, 0\right),$$

where $B=R_x(\arccos(\sqrt{2} \sin y))$.

Decomposition 440 depicts an exemplary decomposition of a gate in the iSWAP Family (x, x, 0), where $$B = R_z\left(2x - \frac{\pi}{2}\right).$$

Consistent with disclosed embodiments, improper orthogonal gates can involve X rotations of $$\frac{\pi}{4}$$

and arbitrary Y and Y rotations. As depicted by decomposition 450, improper orthogonal gates can be generated by 2 SQiSW gates when y+|z|≤π/4. In this case, one has:

$$\alpha = \frac{1}{2}\arccos\left(\cos 2z - \cos 2y + \sqrt{\frac{\cos 4z + \cos 4y}{2}}\right),$$

$$\beta = \frac{1}{2}\arccos\left(\cos 2z - \cos 2y - \sqrt{\frac{\cos 4z + \cos 4y}{2}}\right),$$

$$\gamma = 0.$$

Therefore, $$L\left(\frac{\pi}{4}, y, z\right) \sim SQiSW \cdot (R_x(\alpha) \otimes R_x(\beta)) \cdot SQiSW.$$

In the case of special orthogonal gates, the single qubit corrections can be solved analytically. Let $$\phi = -\arccos\sqrt{\frac{1 + \tan(y-z)}{2}},$$

$$\psi = \arccos\sqrt{\frac{1 + \tan(y+z)}{2}},$$

then $$L = \left(\frac{\pi}{4}, y, z\right) =$$

$$\left(R_x\left(\frac{\phi+\psi}{2}\right) \otimes R_z\left(\frac{\pi}{4}\right)R_x\left(\frac{\phi-\psi}{2}\right)\right) \cdot SQiSW \cdot (R_x(\alpha) \otimes R_x(\beta)) \cdot SQiSW \cdot$$

$$\left(R_x\left(\frac{\phi+\psi}{2}\right) \otimes R_x\left(\frac{\phi-\psi}{2}\right)R_z\left(-\frac{\pi}{4}\right)\right).$$

Figure 5:
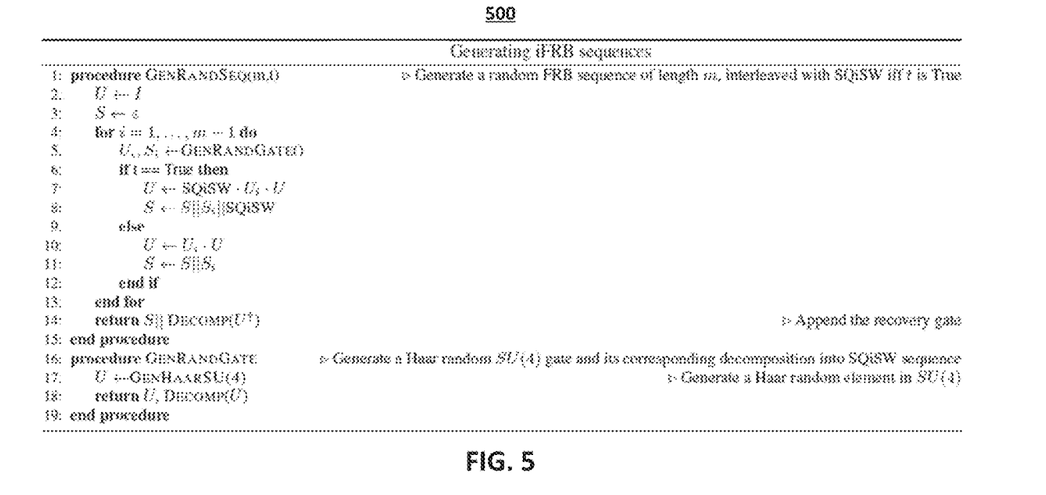
FIG. 5 depicts an exemplary system for decomposing and applying sequences of quantum gates to implement a quantum computation, in accordance with disclosed embodiments.

In some embodiments, iFRB on the SQiSW gate can involve generation of Haar random gate sequences in terms of their decompositions into SQiSW gates and single-qubit rotations. FIG. 5 depicts pseudocode implementing an exemplary method 500 for generating such Haar random gate sequences. In accordance with disclosed embodiments, a Haar random gate in SU(4) can be generated (e.g., at line 17) and then decomposed (e.g., at line 18) according to method 300 (or according to one of the solutions depicted in FIG. 4, depending on the generated gate). The variable U can accumulate the sequence of SQiSW and Haar random gates (e.g., at line 7), while the variable S can accumulate the sequence of SQiSW and decomposed gates (e.g., at line 8). A recovery gate can be calculated, and a decomposition of the recovery gate can be accumulated in variable S (e.g., at line 14).

Cartan decomposition can be time-consuming and so method 300 can be inefficient for generating long FRB sequences. FIG. 6 depicts an example method 600 for efficiently generating SQiSW decompositions of Haar random two-qubit gates that greatly reduces the overhead due to Cartan decompositions.

The distribution of the interaction coefficients (x, y, z) for a Haar random gate g E SU(4) is given by $$d\mu_W \equiv M_w(x, y, z)dx \wedge dy \wedge dz =$$
$$\frac{3}{\pi}[\cos 2x\cos 4y + \cos 2y\cos 4z + \cos 2z\cos 4x -$$
$$\cos 2x\cos 4z - \cos 2y\cos 4x - \cos 2z\cos 4y]dx \wedge dydz$$

Therefore, generation of an SU(4) gate can be done by generating $A_1$, $A_2$, $B_1$, $B_2$ from a Haar random distribution on SU(2) and (x, y, z) from the above distribution, and then outputting $(A_1 \otimes A_2)L(x, y, z)(B_1 \otimes B_2)$. Consistent with disclosed embodiments, sampling from Haar random distribution on SU(2) and sampling (x, y, z) from $d\mu_w$ can be done efficiently. Interleaving single qubit gates between two or three SQiSW gates can then be determined such that the resulting gate is locally equivalent to some given L(x, y, z).

In accordance with disclosed embodiments, as depicted in FIG. 6, the Cartan decomposition can be invoked when the randomly generated interaction coefficients (x, y, z) ∉ W', which is $$\frac{1}{8} + \frac{4}{15\pi} \approx 21\%$$

of the time on average. In some implementations, method 300 can require two Cartan decompositions on average per gate generation. Thus, method 600 can reduce the number of required Cartan decompositions and thereby (for a given amount of computational resources) increase the rate of random gate generation for iFRB.

Figure 7:
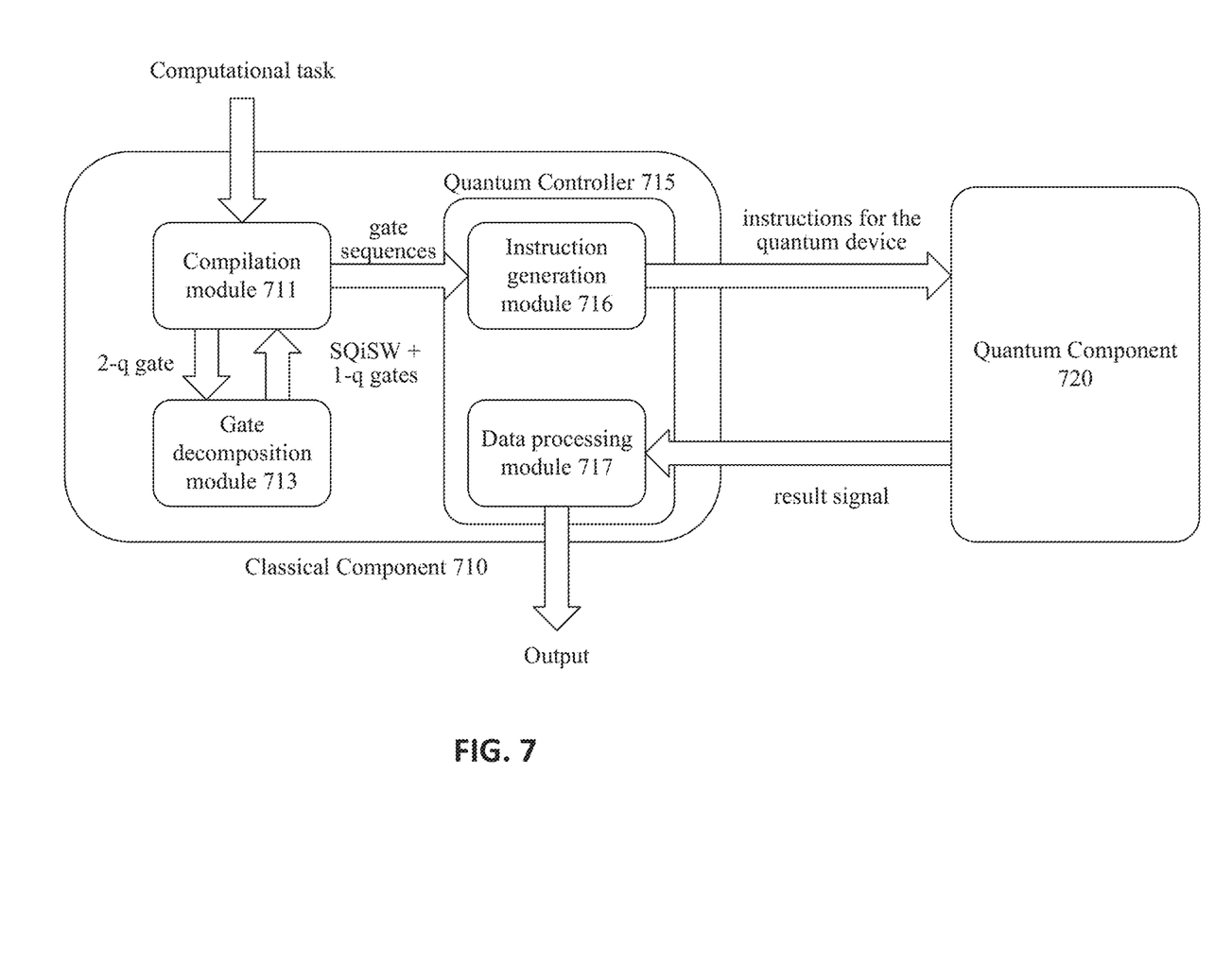
FIG. 7 depicts an exemplary system for decomposing and applying sequences of quantum gates to implement a quantum computation, in accordance with disclosed embodiments.

FIG. 7 depicts a system 700 for decomposing and applying sequences of quantum gates to implement a quantum computation, in accordance with disclosed embodiments. The system 700 can include a classical component 710 (e.g., a classical computing device, or collection of classical computing devices) and a quantum component 720.

Quantum component 720 can be configured to process information using quantum phenomena (e.g., superposition or entanglement). Quantum component 720 can operate on units of information referred to as "qubits". A qubit is the smallest unit of information in quantum computers, and can have any linear combination of two values, usually denoted |0⟩ and |1⟩. The value of the qubit can be denoted |ψ⟩. Different from a digital bit that can have a value of either "0" or "1," |ψ⟩ can have a value of α|0⟩ +β|1⟩ where α and β are complex numbers (referred to as "amplitudes") not limited by any constraint except $|\alpha|^2+|\beta|^2=1$. Qubits can be constructed in various forms and can be represented as quantum states of components of quantum component 720. For example, a qubit can be physically implemented using photons (e.g., in lasers) with their polarizations as the quantum states, electrons or ions (e.g., trapped in an electromagnetic field) with their spins as the quantum states, Josephson junctions (e.g., in a superconducting quantum system) with their charges, current fluxes, or phases as the quantum states, quantum dots (e.g., in semiconductor structures) with their dot spin as the quantum states, topological quantum systems, or any other system that can provide two or more quantum states. Quantum component 720 can apply quantum logic gates (or simply "quantum gates") to create, remove, or modify qubits.

In contrast, classical component 710 can be computing system that cannot perform quantum computations, such as an electronic computer (e.g., a laptop, desktop, cluster, cloud computing platform, or the like). Classical component 710 can operate in digital logic on binary-valued bits. Classical component 710 can include one or more processors (e.g., CPUs, GPUs, or the like), application specific integrated circuits, hardware accelerators, or other components for processing digital logic. Classical component 710 can include one or more memories, buffers, caches, or other components for storing binary values. Classical component 710 can include one or more I/O devices of communicating with other systems, devices (e.g., quantum component 720), users, or the like.

The classical component 710 can be configured to control the quantum device 720. The classical component can include a compilation module 711. Compilation module 711 can be configured to obtain a description of a quantum computation task (a unitary, a quantum circuit, etc.) and determine an implementation of the quantum computation task. The implementation can be a gate sequence. The gate sequence can include SQiSW gates and single-qubit gates.

In some embodiments, gate decomposition module 713 (which may be implemented as a submodule of compilation module 711) can be configured to decompose a given two-qubit gate into a sequence of SQiSW gates and single qubit gates, using the methods described herein (e.g., method 300, as described with regards to FIGS. 3A and 3B). Gate decomposition module 713 can obtain a two-qubits gate from compilation module 711. In response, gate decomposition module 713 can determine and provide to compilation module 711 a sequence of SQiSW gates and single qubit gates that implement the obtained two-qubits gate.

Quantum controller 715 can be configured to directly control quantum component 720. Quantum controller 715 can be a digital computing device (e.g., a computing device including a central processing unit, graphical processing unit, application specific integrated circuit, field-programmable gate array, or other suitable processor). Quantum controller 715 can configure quantum component 720 for computation, provide quantum gates to, and read state information out of quantum circuit 720.

Quantum controller 715 can include an instruction generation module 716. Instruction generation module 716 can be configured to directly or indirectly provide bias drives to quantum circuit 720 to enable or disable interactions between qubits. Instruction generation module 716 can indirectly provide bias drives by providing instructions to a bias drive source (e.g., waveform generator or the like), causing the bias drive source to provide the bias drives to circuit 720. Instruction generation module 716 can apply quantum gates by providing one or more microwave pulses (or other gate drives) to qubits in quantum component 720. In various embodiments, instruction generation module 716 can implement such gates by providing instructions to a computation drive source (e.g., a waveform generator or the like), causing the computational drive source to provide such microwave pulses (or other gate drives) to qubits in quantum component 720. The microwave pulses can be selected or configured to implement one or more quantum gates, as described herein. The microwave pulses can be provided to qubits using one or more coils coupled to the corresponding qubits. The coils can be external to quantum component 720 or on a chip implementing quantum component 720.

Quantum controller 715 can be configured to determine state information for quantum component 720. In some embodiments, quantum controller 715 can measure a state of one or more qubits of quantum component 720. The state can be measured upon completion of a sequence of one or more quantum operations. In some embodiments, instruction Generation Module 716 can provide a probe signal (e.g., a microwave probe tone) to a coupled resonator of quantum component 720, or provide instructions to a readout device (e.g., an arbitrary waveform generator) that provides the probe signal.

In various embodiments, quantum controller 715 can include a data processing module 717. Data processing module 717 can take the output signal (e.g., electrical/photonic), transform it into discrete signals, and perform data processing on it (e.g., averaging, post-processing) to obtain a computational result. In some embodiments, data processing module 717 can include, or be configured to receive information from, a detector configured to determine an amplitude and phase of an output signal received from the coupled resonator in response to provision of the microwave probe tone. The amplitude and phase of the output signal can be used to determine the state of the probed qubit(s). The disclosed embodiment are not limited to any particular method of measuring the state of the qubits.

Quantum component 720 can be configured to receive commands (e.g., bias drives, quantum gates, probe signal, or the like) from the classical component 710. In some embodiments, quantum component 720 can be implemented using a superconducting quantum circuit coupled to quantum controller 715 using at least one microwave drive line. The superconducting quantum circuit can implement multiple qubits (e.g., transmon qubits, fluxonium qubits, or any other suitable type of qubit), consistent with disclosed embodiments. In some embodiments, the superconducting quantum circuit can be realized using one or more chips containing the qubits, each of the chip(s) including at least a portion of the microwave drive line(s) coupling the qubit(s) to quantum controller 715.

Figure 8:
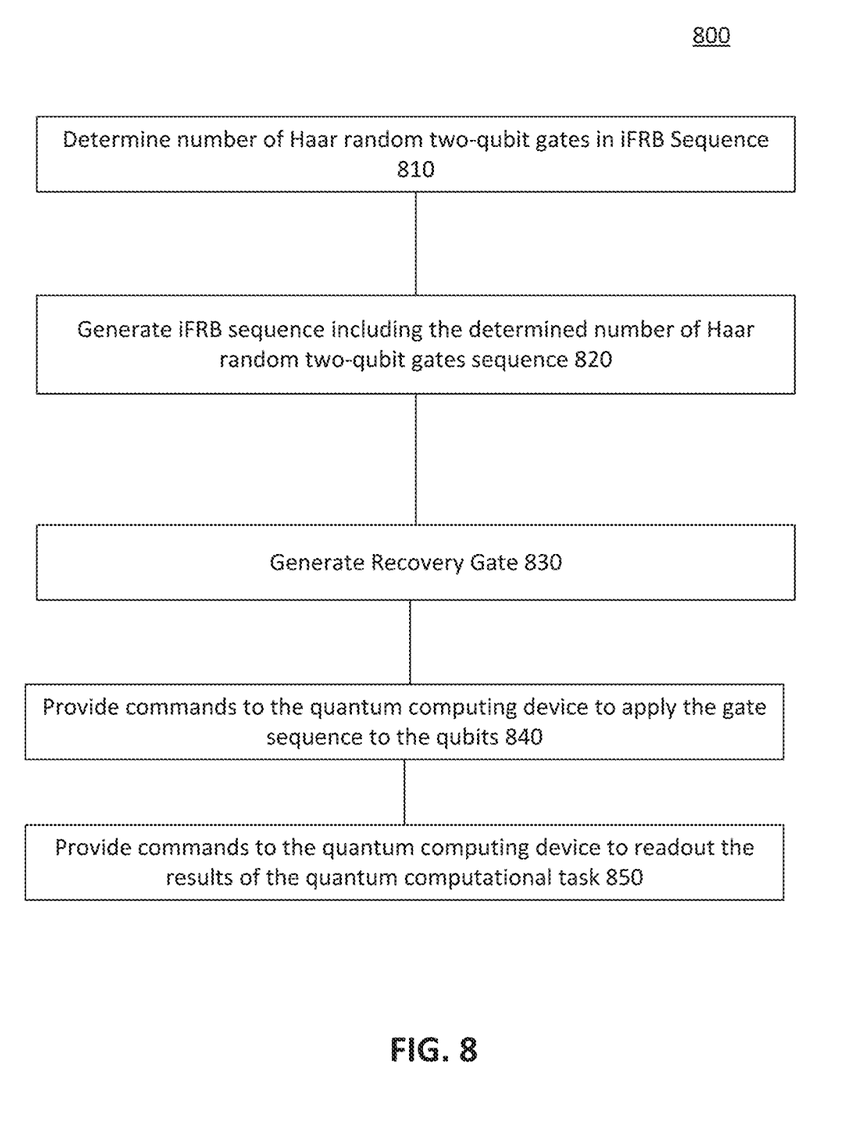
FIG. 8 depicts an exemplary method for performing iFRB using SQiSW gates and single-qubit gates, in accordance with disclosed embodiments.

FIG. 8 depicts an exemplary method 800 for performing iFRB using SQiSW gates and single-qubit gates, in accordance with disclosed embodiments. In some embodiments, method 800 can be performed using system 700. Method 800 can include operations performed on a conventional computing device (e.g., a mobile device, laptop, desktop, workstation, computing cluster, cloud-computing platform, or the like) such as classical component 710. Method 800 can include operations performed on a quantum computing device (e.g., a quantum controller managing a superconducting circuit, trapped ion quantum systems, topological quantum computing systems, photonic quantum computing systems, or the like) such as quantum component 720. An iFRB gate sequence can be generated by the conventional computing device. The conventional computing device can provide instructions configuring the quantum computing device to apply the gate sequences to an appropriate arrangement of qubits. The quantum computing device can perform the benchmarking by applying the gate sequence. The conventional computing device can then provide instructions to the quantum computing device to read out the results of the benchmarking.

In step 810, the conventional computing device can determine a number n of Haar random two-qubit gates in the iFRB sequence.

In step 820, the conventional computing device can generate iFRB sequence including the determined number of Haar random two-qubit gates sequence. In some embodiments, the conventional computing device can generate the number n of Haar random two-qubit gates in the iFRB sequence. The Haar random two-qubit gates can be interleaved with a target gate for benchmarking (e.g., an SQiSW gate) into a first iFRB sequence. In various embodiments, the conventional computing device can also generate decompositions of the Haar random two-qubit gates, in accordance with method 300. The decompositions can be interleaved with the target gate for benchmarking into a second iFRB sequence. In some embodiments, generation of the Haar random two-qubit gates can proceed iteratively. For example, while the number of FRB gates generated is less than n, the conventional computing device can generate a Haar random two-qubit gate, interleave the generated gate with the target gate into the first iFRB sequence, and interleave a decomposition of the generate gate with the target gate into the second iFRB sequence.

In step 830, a recovery gate can be generated, according to method 300. The conventional computing device can generate the decomposition according to method 300 of the Hermitian conjugate of the first iFRB sequence. In some embodiments, only the second iFRB sequence is generated and the recovery gate is the decomposition according to method 300 of the Hermitian conjugate of the second iFRB sequence.

In step 840, the conventional computing device can provide commands to the quantum computing device (e.g., quantum component 720) to apply the combination of the second iFRB sequence and the recovery gate to the appropriate arrangement of qubits. The quantum computing device can implement the iFRB benchmarking by applying the combined sequence to the qubits.

In step 850, the conventional computing device can provide commands to the quantum computing device to readout the results of the quantum computational task.

Figure 9:
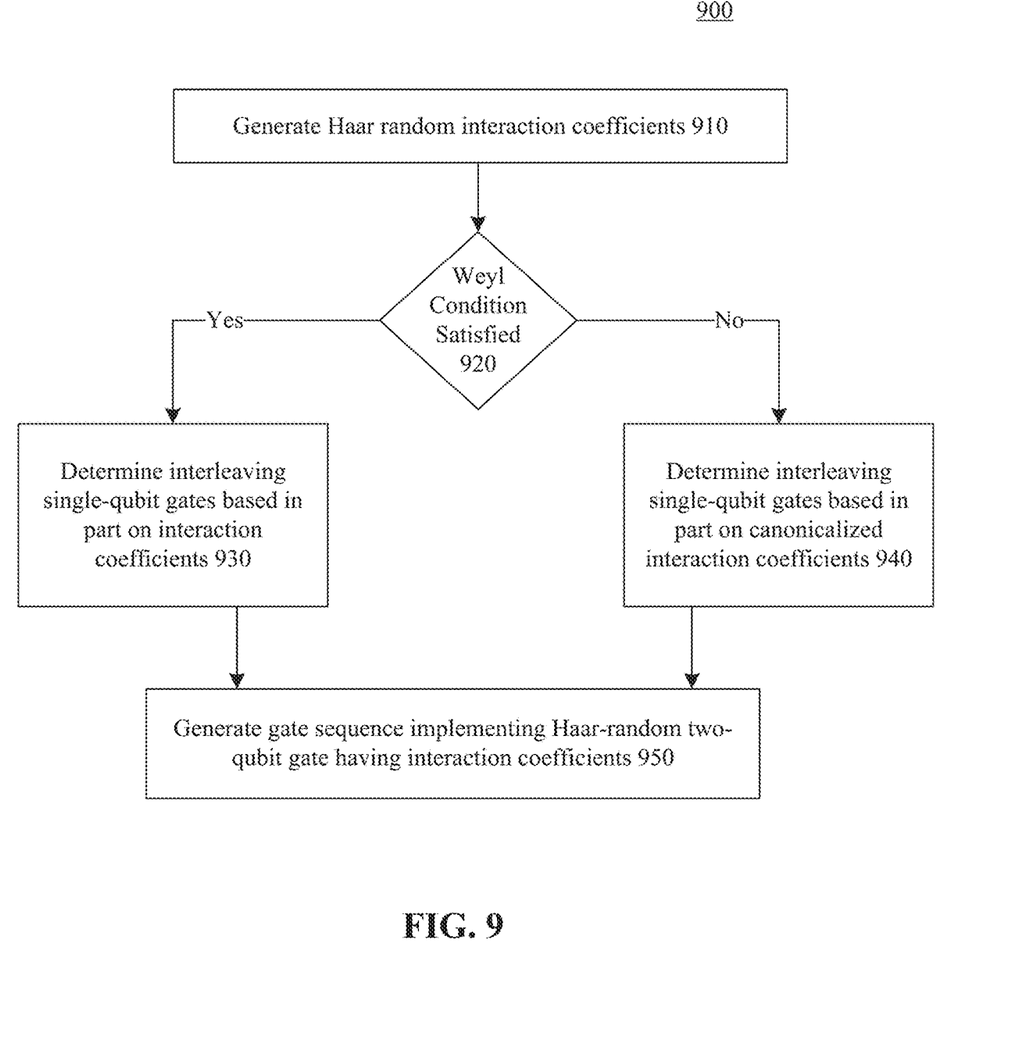
FIG. 9 depicts an exemplary method for generating two-qubit gates, in accordance with disclosed embodiments.

FIG. 9 depicts an exemplary method 900 for generating two-qubit gates, in accordance with disclosed embodiments. In some embodiments, method 900 can be performed as an alternative to the use of method 300 in step 820 in method 800. Using method 900, a Haar random gate $U(x, y, z)$ in $SU(4)$ can be generated, potentially without having to perform a Cartan decomposition.

In step 910, the conventional computing device can generate three interaction coefficients $(x, y, z)$ for a Haar random gate $U(x, y, z)$ in $SU(4)$. The conventional computing device can also generate four Haar random single-qubit gates $B_1, B_2, C_1, C_2$. These single-qubit gates can be used to generate the Haar random gate $U(x, y, z)$, as described herein.

In step 920, the conventional computing device can determine whether a Weyl condition is satisfied for the interaction coefficients (e.g., $|z| \leq x-y$). When the Weyl condition is satisfied, method 900 can proceed to step 930. When the Weyl condition is not satisfied, method 900 can proceed to step 940.

In step 930, when the Weyl condition is satisfied, the conventional computing device can be configured to generate two interleaved single-qubit gates $A_1, A_2$. These two gates can be generated such that:

$$U(x,y,z)=(B_1 \otimes B_2)\|SQiSW\|(A_1 \otimes A_2)\|SQiSW\|$$
$$(C_1 \otimes C_2).$$

In some embodiments, the two interleaved single-qubit gates $A_1, A_2$ can be generated using the functions $f(x, y, z)$ and $g(x, y, z)$, as described herein. In step 940, when the Weyl condition is not satisfied, the three interaction coefficients $(x, y, z)$ can be canonicalized to generate, in part, single-qubit gates $E_1, E_2$, and interaction coefficients $(x', y', z')$ for a gate $U(x', y', z')$. A KAK decomposition can then be performed on $U(x', y', z')$ to generate, in part, single-qubit gates $H_1, H_2$. Then two single-qubit gates $A_1, A_2$ can be generated such that:

$$U(x,y,z)=(B_1 \otimes B_2)\|SQiSW\|(H_1 \cdot E_1 \otimes H_2 \cdot E_2)\|SQiSW\|$$
$$(A_1 \otimes A_2)\|SQiSW\|(C_1 \otimes C_2).$$

The disclosed embodiments are not limited to embodiments including a quantum computing device. In some embodiments, application of the gate sequence to the appropriate arrangement of qubits can be simulated by the original conventional computing device or another, separate conventional computing device. For example, the gate sequence could be generated on a laptop and application of the gate sequence could be stimulated using a cloud-computing platform. Upon completion of the simulation, the simulation results could be provided to the original conventional computing device.

In step 950, the conventional computing device can determine the gate sequence implementing the Haar random gate $U(x, y, z)$. The gate sequence can include two SQiSW gates when the Weyl condition is satisfied, or three SQiSW gates when the Weyl condition is not satisfied, as described herein.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent gates, modifications, omissions, combinations (e.g., of aspects across various embodiments), adaptations or alterations based on the present disclosure. The gates in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation or restriction of the scope of the embodiments, the scope being defined by the following claims.

What is claimed is:

1. A system for performing Interleaved Fully Randomized Benchmarking (iFRB), comprising:
   a quantum component; and
   a classical component, the classical component including at least one processor, and at least one non-transitory computer-readable medium containing instructions that, when executed by the at least one processor, cause the classical component to perform operations comprising:
      generating a gate sequence including test gates interleaved with gate subsequences equivalent to Haar random two-qubit gates, each gate subsequence including at least one SQiSW gate;
      generating a recovery gate based on the gate sequence; and
      providing commands applying the gate sequence and the recovery gate to the quantum component and obtaining an output from the quantum component.

2. The system of claim 1, wherein:
   generating one of the gate subsequences comprises generating a Haar random two-qubit gate and decomposing, using two Cartan decompositions, the Haar random two-qubit gate into the one of the gate subsequences.

3. The system of claim 1, wherein:
generating one of the gate subsequences comprises:
sampling a point in a Weyl chamber; and
generating the one of the gate subsequences based on the sampled point.

4. The system of claim 3, wherein:
generating the one of the gate subsequences further comprises sampling four Haar-random single-qubit gates; and
the one of the gate subsequences is generated using the sampled four Haar-random single-qubit gates.

5. The system of claim 1, wherein:
generating one of the gate subsequences comprises generating three interaction coefficients;
when the three interaction coefficients satisfy a Weyl condition, the one of the gate subsequences includes two SQiSW gates; and
when the three interaction coefficients do not satisfy the Weyl condition, the one of the gate subsequences includes three SQiSW gates.

6. The system of claim 5, wherein:
generating the one of the gate subsequences further comprises:
determining interleaving single qubit gates based on the three interaction coefficients.

7. The system of claim 6, wherein:
generating the one of the gate subsequences further comprises:
sampling four Haar-random single-qubit gates; and
generating the one of the gate subsequences using the interleaving single qubit gates and the four sampled Haar-random single-qubit gates.

8. The system of claim 5, wherein:
generating one of the gate subsequences comprises:
generating three canonicalized interaction coefficients and two first single-qubit gates using the three interaction coefficients;
generating two second single-qubit gates by performing a Cartan decomposition on a gate corresponding to the three canonicalized interaction coefficients;
determining second interleaving single-qubit gates based on the three canonicalized interaction coefficients; and
generating the one of the gate subsequences using the second interleaving single-qubit gates, the two first single-qubit gates, and the two second single-qubit gates.

9. The system of claim 1, wherein:
the test gates comprise SQiSW gates.

10. A non-transitory computer-readable medium containing instructions that, when executed by at least one processor, cause a system to perform operations for performing iFRB benchmarking, comprising:
generating a gate sequence including test gates interleaved with gate subsequences equivalent to Haar random two-qubit gates, each gate subsequence including at least one SQiSW gate;
generating a recovery gate based on the gate sequence; and
providing commands applying the gate sequence and the recovery gate to a quantum component and obtaining an output from the quantum component.

11. The non-transitory computer-readable medium of claim 10, wherein:
generating one of the gate subsequences comprises generating a Haar random two-qubit gate and decomposing, using two Cartan decompositions, the Haar random two-qubit gate into the one of the gate subsequences.

12. The non-transitory computer-readable medium of claim 10, wherein:
generating one of the gate subsequences comprises:
sampling a point in a Weyl chamber; and
generating the one of the gate subsequences based on the sampled point.

13. The non-transitory computer-readable medium of claim 10, wherein:
generating one of the gate subsequences comprises generating three interaction coefficients;
when the three interaction coefficients satisfy a Weyl condition the one of the gate subsequences includes two SQiSW gates; and
when the three interaction coefficients do not satisfy the Weyl condition the one of the gate subsequences includes three SQiSW gates.

14. The non-transitory computer-readable medium of claim 13, wherein:
generating the one of the gate subsequences further comprises:
determining interleaving single qubit gates based on the three interaction coefficients;
sampling four Haar-random single-qubit gates; and
generating the one of the gate subsequences using, in part, the interleaving single qubit gates and the four sampled Haar-random single-qubit gates.

15. The non-transitory computer-readable medium of claim 13, wherein:
generating one of the gate subsequences comprises:
generating three canonicalized interaction coefficients and two first single-qubit gates using the three interaction coefficients;
generating two second single-qubit gates by performing a Cartan decomposition on a gate corresponding to the three canonicalized interaction coefficients;
determining second interleaving single-qubit gates based on the three canonicalized interaction coefficients; and
generating the one of the gate subsequences using, in part, the second interleaving single-qubit gates, the two first single-qubit gates, and the two second single-qubit gates.

16. A method of performing iFRB benchmarking, comprising:
generating a gate sequence including test gates interleaved with gate subsequences equivalent to Haar random two-qubit gates, each gate subsequence including at least one SQiSW gate;
generating a recovery gate based on the gate sequence; and
providing commands applying the gate sequence and the recovery gate to a quantum component and obtaining an output from the quantum component.

17. The method of claim 16, wherein:
generating one of the gate subsequences comprises generating a Haar random two-qubit gate and decomposing, using two Cartan decompositions, the Haar random two-qubit gate into the one of the gate subsequences.

18. The method of claim 16, wherein:
generating one of the gate subsequences comprises:
- sampling a point in a Weyl chamber; and
- generating the one of the gate subsequences based on the sampled point.

19. The method of claim 16, wherein:
generating one of the gate subsequences comprises:
- generating three interaction coefficients;
- determining interleaving single qubit gates based on the three interaction coefficients;
- sampling four Haar-random single-qubit gates; and
- generating the one of the gate subsequences using, in part, the interleaving single qubit gates and the four sampled Haar-random single-qubit gates.

20. The method of claim 16, wherein:
generating one of the gate subsequences comprises:
- generating three interaction coefficients;
- generating three canonicalized interaction coefficients and two first single-qubit gates using the three interaction coefficients;
- generating two second single-qubit gates by performing a Cartan decomposition on a gate corresponding to the three canonicalized interaction coefficients;
- determining second interleaving single-qubit gates based on the three canonicalized interaction coefficients; and
- generating the one of the gate subsequences using, in part, the second interleaving single-qubit gates, the two first single-qubit gates, and the two second single-qubit gates.

* * * * *